Dec. 12, 1967  D. G. THON  3,357,165
CUTTER SUSPENSION APPARATUS FOR MOWER
Filed Jan. 18, 1965  3 Sheets-Sheet 1

INVENTOR.
DONALD G. THON
BY

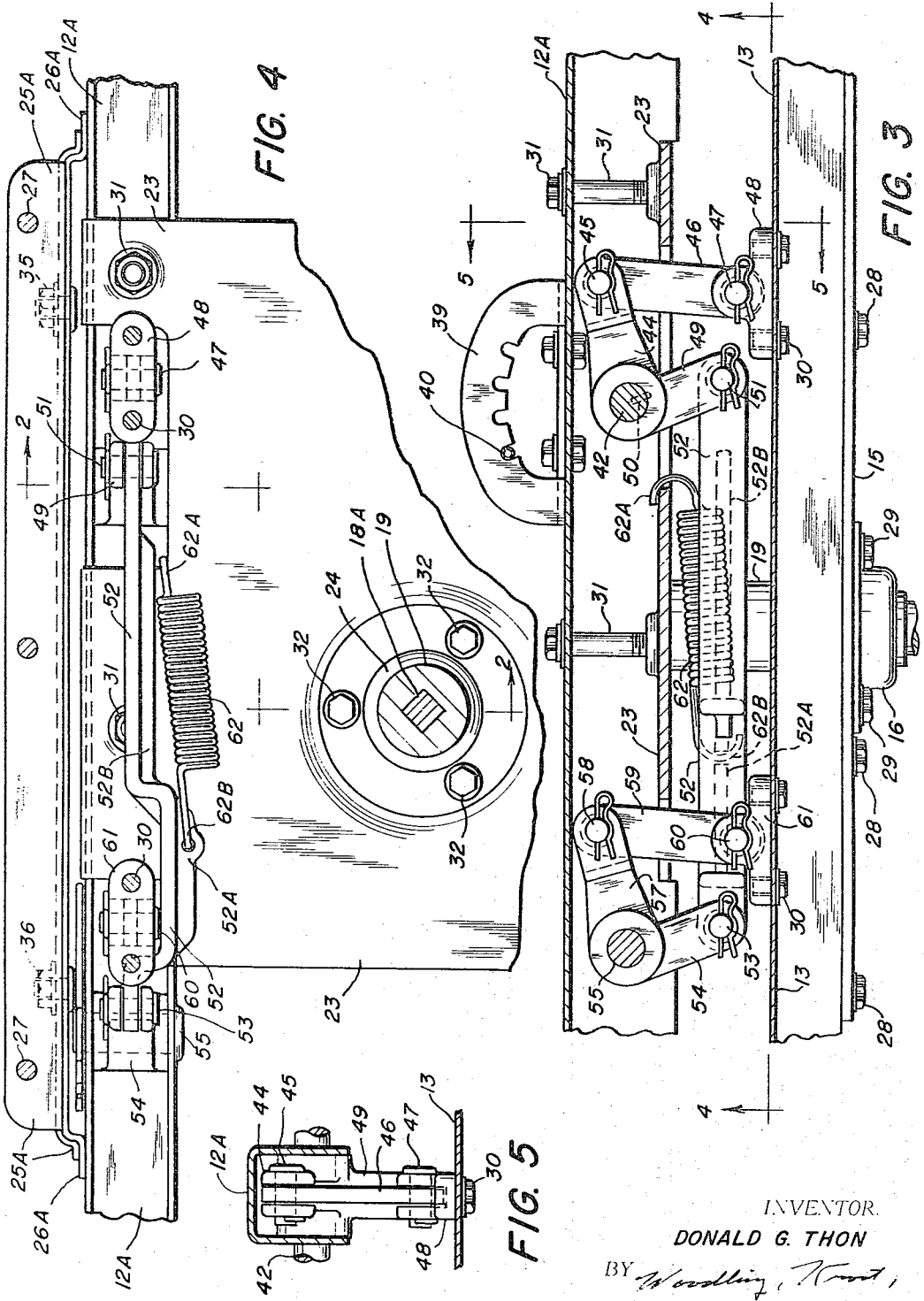

Dec. 12, 1967     D. G. THON     3,357,165
CUTTER SUSPENSION APPARATUS FOR MOWER
Filed Jan. 18, 1965     3 Sheets-Sheet 3

INVENTOR.
DONALD G. THON

United States Patent Office 3,357,165
Patented Dec. 12, 1967

3,357,165
CUTTER SUSPENSION APPARATUS FOR MOWER
Donald G. Thon, Cleveland, Ohio, assignor to the
M. F. & D. Company, a corporation of Ohio
Filed Jan. 18, 1965, Ser. No. 426,267
12 Claims. (Cl. 56—25.4)

ABSTRACT OF THE DISCLOSURE

A mower having a cutter unit suspended from the mower frame and driven by the motor of the mower, the suspension mechanism including four crank arms pivotally connected to the mower frame at four spaced locations, respectively, on the opposite sides of the mower frame, four links each having an end pivotally connected to a free end of a crank arm and another end pivotally connected to the cutter unit below whereby swinging of the crank arms raise and lower the cutter unit without causing it to swing in an arc, connecting means interconnecting the other ends of the crank arms to cause them to swing in unison, resilient means urging the crank arms to swing together in a direction to help support the cutter unit, a lever so operatively connected to the crank arms through rotative means as to cause the crank arms to swing in unison and thus raise and lower the cutter unit, and guide means along the opposite sides of the cutter unit and the opposite sides, respectively, of the mower frame as to guide the vertical movement of the cutter unit.

---

My invention relates to mowers, such as lawn mowers, and particularly to the apparatus for suspending the cutter mechanism from the frame of the mower.

An object of my invention is to provide an improved means for suspending the cutter mechanism from a mower so as to provide for ready and easy adjustment of the elevation of the cutter mechanism relative to the frame.

Another object is the elimination of the need for changing the height of a mower frame relative to the mower wheels in order to vary the cutting height of the mower relative to the ground surface.

Another object is the provision of improved suspension means for a cutter mechanism which permits the cutter mechanism to be raised and lowered relative to a mower frame while the cutter mechanism is operating and while the mower is traveling.

Another object is the provision of efficient means whereby the operator riding a riding mower may easily and quickly change the cutting height of a cutter mechanism carried by a mower while carrying out the lawn-cutting operation even while riding along from one area to another.

Another object is the provision for producing improved operating results in an ingenious manner with a minimum of working parts.

Another object is the provision of improved results in the use of a mower in a novel and unique manner.

Other objects and a fuller understanding of the invention may be had by referring to the following description and claims, taken in conjunction with the accompanying drawings, in which:

FIGURE 3 is an enlarged cross-sectional view of the cutter mechanism taken longitudinally of the mower and through the line 3—3 of FIGURE 2;

FIGURE 4 is a bottom view looking upwardly at the apparatus shown in FIGURE 3 and looking in the direction of the arrows 4—4 of FIGURE 3;

FIGURE 5 is an enlarged sectional view taken through the line 5—5 of FIGURE 3.

Figure 1:
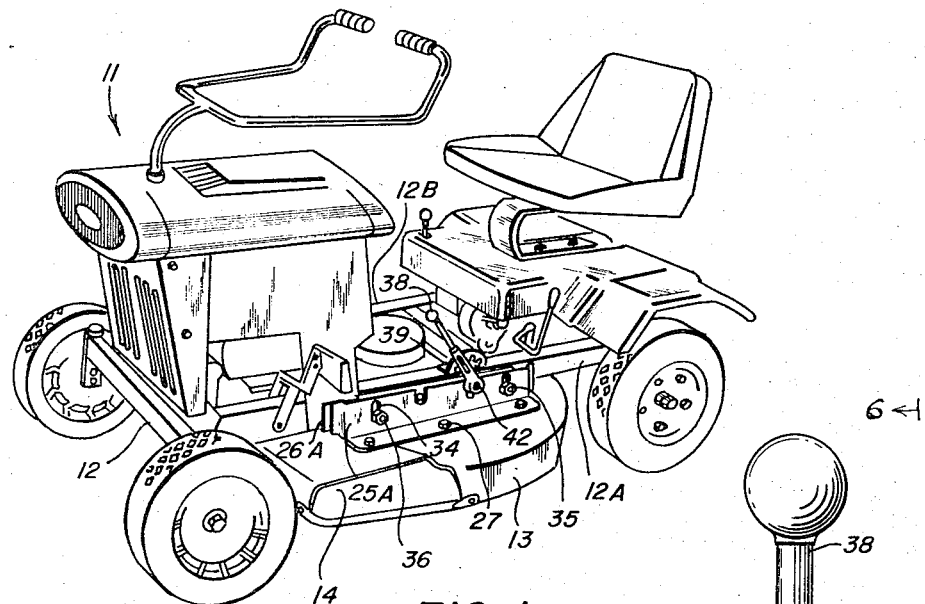
FIGURE 1 is a perspective view of a riding mower to which my invention has been applied and illustrating a preferred form of the invention.

The tractor type mower shown by way of example and to which my improved apparatus is shown mounted in FIGURE 1 has been denoted generally by the reference character 11. It is understood that my invention is not limited to such a riding mower but it is particularly advantageous when applied to a riding mower of this general class. The mower 11 has a rectangular supporting steel frame 12 having longitudinally extending frame members, frame member 12A on the left and frame member 12B on the right side of the mower as viewed by the operator riding on the seat of the tractor mower.

Disposed below and carried by the frame 12 is a shroud or hood 13 of the general type utilized for housing the cutting blades of a rotary mower. The hood 13 has a discharge chute 14 on one side from which the cut grass or other vegetation is tangentially thrown by the blades as they rotate. Secured centrally of the hood 13 near the bottom thereof by nut and bolt assemblies 28 is a plate 15. This plate 15 closes a central opening in the hood 13. A bearing assembly indicated generally by the reference character 16 is secured to the plate 15 by nut and bolt assemblies 29. Journaled to this bearing assembly 16 and extending vertically therethrough in an upright manner is a cutter-revolving shaft 17. Nonrotatively secured to the lower end of the shaft 17 so as to rotate therewith is a usual cutting blade 21, secured thereto by a nut 22. The cutting blade 21 may be of one piece extending across and on opposite sides of the axis of the shaft 17 and may also be of the form having two parts extending across at an angle to each other, this is, a blade having four radial sections. Also the shaft 17 may be connected by belts, gearing, or otherwise, to other cutters, as for example, two cutters in those arrangements wherein three cutters are simultaneously revolved, as in some mowing mechanisms.

Above the hood 13 and plate 15 there is a transverse supporting plate 23. Secured to this supporting plate 23 by means of nut and bolt assemblies 32 is a bearing assembly denoted generally by the reference character 24. Extending uprightly into and carried by the bearing assembly 24 is an upright motor-driven shaft 18. The upper end of this shaft 18 is operatively interconnected with the motor of the tractor mower in the usual manner whereby the motor rotates the shaft 18. It is to be noted that the shafts 18 and 17 are in axial alignment but are not directly connected and the vertical spacing between the shafts is variable.

The lower end of shaft 18 is noncircular in cross-section, in this case generally square in cross-section. A sleeve 19 has its upper bore of similar noncircular shape, in this case square cross-sectional shape which complements the shape of the cross-section 18A, whereby rotation of the shaft 18 causes simultaneous rotation of the sleeve 19 therewith. The sleeve 19 slidably interfits with the shaft portion 18A whereby the sleeve 19 may freely move up and down parallel with the axis of the shaft 18 while maintained in driving engagement therewith. The sleeve 19 is firmly secured to the upper end of the cutter-revolving shaft 17 by means of a cross-pin 20 which extends through both the shaft 17 and the sleeve 19. Thus rotation of the sleeve 19 causes simultaneous rotation of the shaft 17. It is also seen that there is a telescopic interconnection between the motor-driven shaft 18 and the cutter-revolving shaft 17 which telescopic interconnection maintains at all times the delivery of the driving force from the motor to the cutter mechanism while permitting variable elevation of the hood 13, plate 15, assembly 16, shaft 17 and cutting blade 21, making up the elevational cutter mechanism, relative to the frame.

To provide means for guiding the vertical up and down movement of the cutter mechanism including the hood 13 relative to the frame, guide means are provided. These guide means include a guide plate 25A on the left side of the mower and a guide plate 25B on the right side of the mower. These plates are of a generally right-angle configuration in cross-section. The horizontally disposed portions of the guide plates 25A and 25B are secured by nut and bolt assemblies 27 to the upper wall of the hood 13. Thus the guide plates 25A and 25B are so secured to the hood 13 as to move therewith and are referred to herein as movable guide plates.

Figure 2:
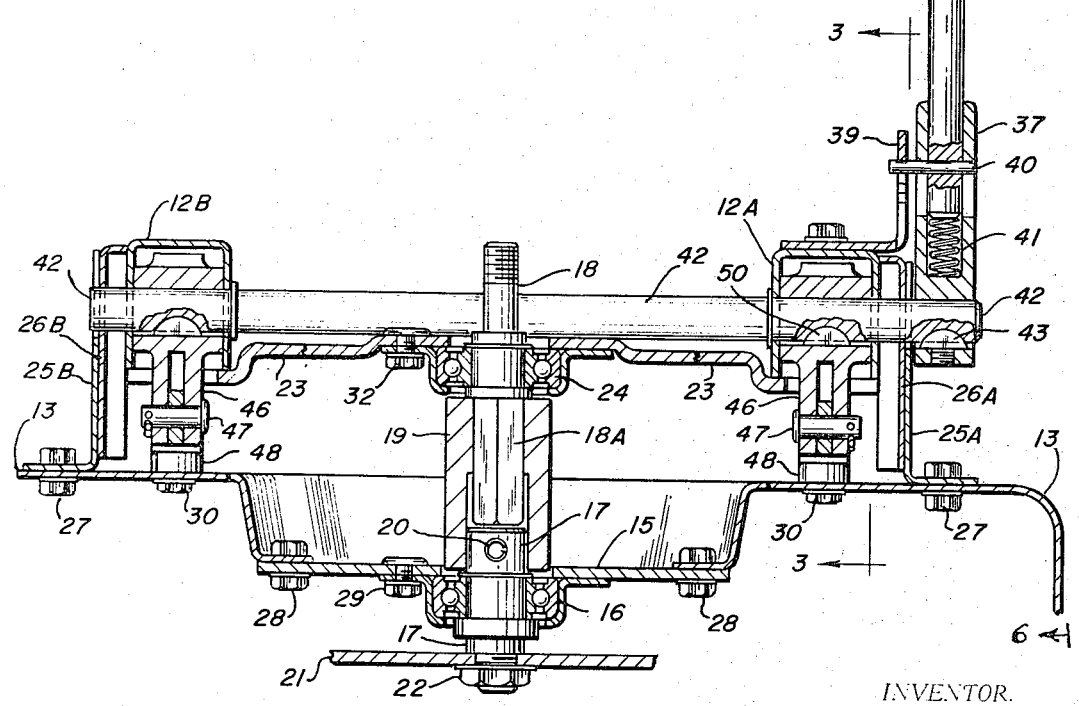
FIGURE 2 is an enlarged cross-sectional view of the cutter mechanism taken transversely of the mower looking in the direction of the arrows 2—2 of FIGURE 4 and showing details of my apparatus.
Figure 6:
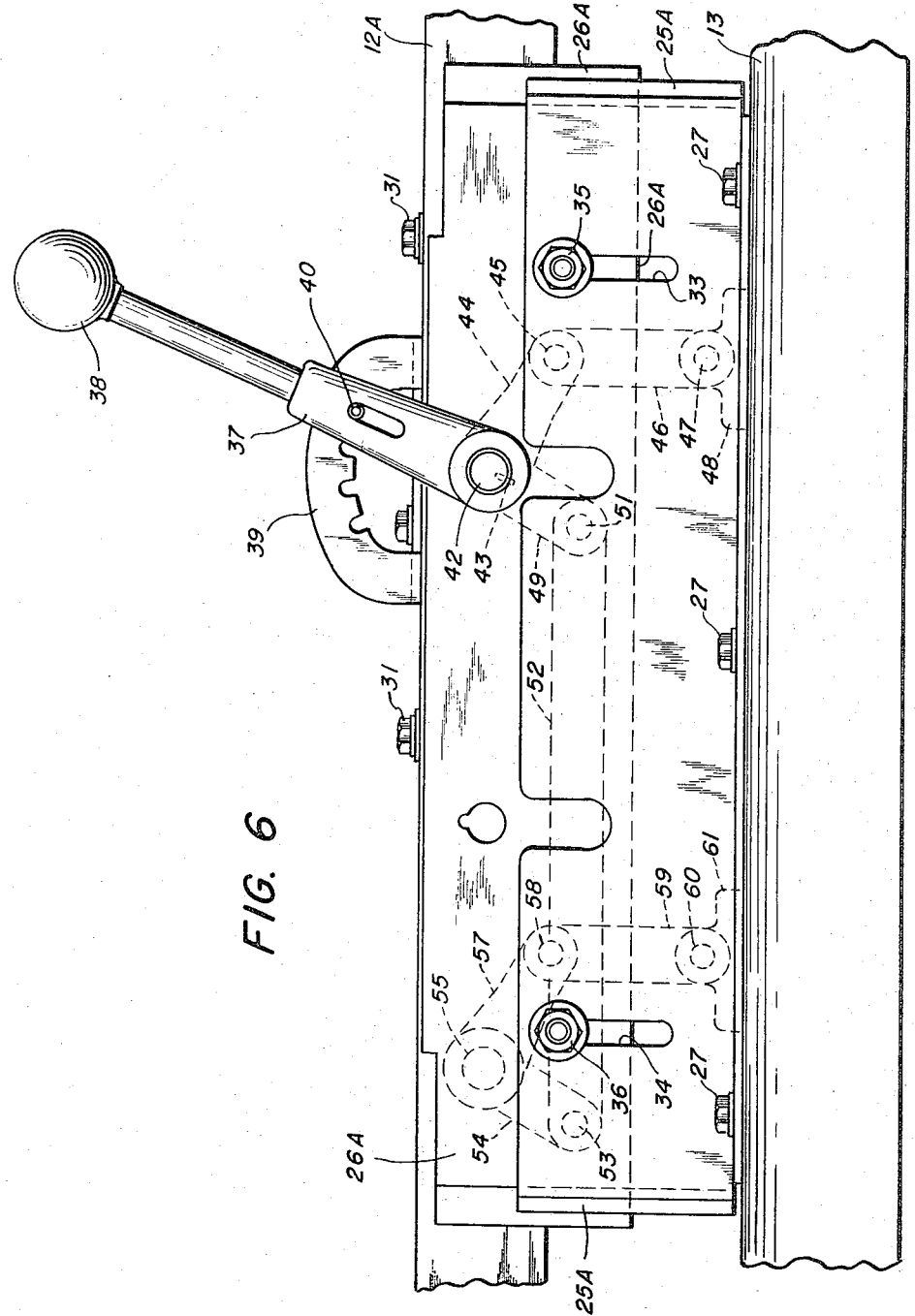
FIGURE 6 is a side view taken longitudinally of the mower and the apparatus shown in FIGURE 2 and looking in the direction of the arrows 6—6 of FIGURE 2.

Secured to the side of the frame member 12A is a fixed guide plate 26A and secured to the side of the frame member 12B is a fixed guide plate 26B, these being fixed by welding or other appropriate means. The movable guide plate 25A is in sliding interengagement with the fixed guide plate 26A, and similarly the movable guide plate 25B is in sliding interengagement with the fixed guide plate 26B. Thus the movable guide plates 25A and 25B move upwardly and downwardly with the hood 13 in close proximity to the fixed guide plates 26A and 26B in the planes illustrated in FIGURE 2.

Carried by the respective fixed guide plates 26A and 26B and extending outwardly therefrom in a horizontal plane are nut and bolt assemblies 35 and 36. The shanks of the bolts of the nut and bolt assemblies 35 and 36 extend through vertically disposed slots 33 and 34 in the upright portion of the respective movable guide plates 25A and 25B. Thus the bolt shanks of the assemblies 35 and 36 fixedly carried by the frame member permit limited vertical movement of the movable guide plates 25A and 25B relative to the respective fixed guide plates 26A and 26B. This arrangement permits relative but limited movement in an up and down direction of the hood 13 and parts carried thereby relative to the frame of the mower.

The transverse supporting plate 23 is fixed carried by the frame 12 by means of four nut and bolt assemblies 31. The nut and bolt assemblies 31 have relatively long bolt shanks whereby the plate 23 is positioned somewhat below the upper plane of the frame members as seen in FIGURE 3. Two nut and bolt assemblies 31 at longitudinally spaced locations secure one side of the plate 23 to the frame member 12A and two longitudinally spaced nut and bolt assemblies 31 secure the other side of the plate 23 to the frame member 12B. The plate member 23 is thus fixedly secured to the frame and extends in a generally horizontal plane.

Journaled on the frame 12 and extending transversely of the mower through the frame members 12A and 12B is a shaft or bar 42 which may be rotated on its axis. Secured to an end of the shaft 42 protruding outwardly on the left side of the mower by means of a key 43 and a set screw is a lever member 37 extending radially of the axis of the shaft 42 and generally upward. This lever member 37 has extending therefrom in axial alignment with the major portion of the lever member 37, a handle portion 38 terminating in a knob readily manually held and manipulated by the operator of the mower riding in the seat thereof. The handle portion 38 is spring-biased outwardly relative to the major portion of the lever member 37 by means of a coil spring 41 within the lever member 37 and pushing upwardly on the bottom of the handle portion 38. The lever member 37 has a longitudinal slot therein through which a detent pin 40 carried by the handle portion 38 may slide or move longitudinally of the lever member 37. Thus the detent pin 40 is resiliently urged away from the axis of the shaft 42 along with the handle portion 38. Carried by the frame member 12A inwardly of the lever member 37 and above the shaft 42 is a toothed arc member 39, the teeth of which may be selectively engaged by the detent pin 40. The arrangement thus permits in the well-known manner the shifting of the lever made up of portions 37 and 38 in an arc around the axis of the shaft 42 and the selective interengagement of the pin 40 between certain teeth of the arc member 39 whereby the lever is held or maintained in predetermined position.

Carried by the frame 12 and particularly by the frame members 12A and 12B are two stub shafts 55. The two stub shafts 55 are in axial alignment with each other, which axis is generally horizontal and parallel to the axis of the shaft or rod 42. There is a stub shaft 55 on each side of the frame at a location forwardly of, and in the same general plane as, the axis of the shaft 42.

Nonrotatively secured to the rotatable shaft 42 by means of keys 50 are two integral crank members each made up of a first crank arm 49 and a second crank arm 44. As better seen in FIGURE 3, the crank arms 44 and 49 are at an acute angle to each other. Rotation of the shaft 42 causes simultaneous swinging of the crank arms 44 and 49 in arcs about the axis of the shaft 42. The crank members made up of first and second crank arms 49 and 44 are adjacent the opposite ends of the shaft 42 within and adjacent the frame members 12A and 12B, that is, on opposite sides of the mower.

Pivotally mounted on each of the forward stub shafts 55 are two crank members each made up of a first crank arm 54 and a second crank arm 57 disposed at an acute angle to each other. The crank members made up of crank arms 54 and 57 are preferably integral or interengaged so that swinging of the first crank arm 54 in an arc causes simultaneous swinging of the second crank arm 57 of the respective crank member on a common axis. Also, the simultaneous swinging of both forward first crank arms 54 causes corresponding swinging of both forward second crank arms 57. Interconnecting the lower ends of the first crank arms 49 and 54 on each side of the mower is a long link or rod 52 extending along such side. Pivot pins 51 pivotally connect the rearward end of each long link or rod 52 to the lower end of the respective first crank arms 49. Pivot pins 53 pivotally connect the forward end of each long link or rod 52 to the lower end of the respective second crank arms 54. Thus swinging movement of a first crank arm 49 by means of rotation of the shaft 42 causes corresponding swinging of a forward crank arm 54, this assembly and action being similar on opposite sides of the mower.

Pivotally connected by means of pivot pins 45 to the outer or free end of each rearward second crank arm 44 on the opposite sides of the mower is a link 46. Each link 46 carried by a second crank arm 44, respectively, extends downwardly therefrom and is pivotally connected at its lower end by a pivot pin 47 to an anchor member 48 secured by nut and bolt assemblies 30 to the hood 13.

Also the outer or free end of each forward second crank arm 57 is pivotally connected by a pivot pin 58 to a link 59, there being a link 59 so connected to each of the two crank arms 57. The links 59 extend generally downwardly and the lower end of each is pivotally connected by a pin 60 to a forward anchor member 61, which in turn is secured by nut and bolt assemblies 30 to the hood 13. There are four anchor members secured to the hood 13, two on one side of the mower and two on the other side.

To aid in supporting the hood 13 and the parts carried thereby including the cutter mechanism, there are provided two coil springs 62 each having one hooked end 62A secured to the supporting plate 23 and an opposite hooked end 62B secured to one of the long links or rods 52 as seen in FIGURE 3. The bias of the springs 62 is such as to resiliently urge the two long links or rods 52 rearwardly of the mower, that is, toward the right as seen in FIGURES 1 and 3. This bias provided by the springs 62 is such as to aid the support, in opposition to the force of gravity, of the vertically movable parts of the apparatus including the hood 13, plate 15, bearing assembly 16, shaft 17, sleeve 19 and cutting blade 21.

By means of the operator swinging the handle portion 38 forwardly and rearwardly relative to the frame, the cutter mechanism and parts associated therewith, which are vertically movable relative to the frame, may be raised and lowered at will. Through the power transmission means described, the power train between the motor and the cutting blade may be in continuous driving engagement during shifting of the elevation of the cutter mechanism and at any of its selected elevations. There is no need to stop the motor nor to stop travel of the tractor mower. The cutter mechanism is guided to move up and down in a vertical path toward and away from the frame while the cutter mechanism including its support is maintained in a generally horizontal plane, that is, a plane generally parallel to the plane of the frame. There is no need to change the axles of the wheels supporting the tractor mower as is sometimes done in other mowers when it is desired to change the cutting height of the cutter mechanism. Other advantages and benefits will be apparent to those knowing the problems and difficulties of the prior mowers.

The present disclosure includes that contained in the appended claims, as well as that of the foregoing description.

Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and scope of the invention as hereinafter claimed.

What is claimed is:

1. Apparatus for raising and lowering a rotary cutter mechanism relative to the frame of a mower, the frame having a pair of spaced and longitudinally extending frame members, the mower having a motor carried by the frame and a motor-driven shaft extending downwardly along an axis disposed generally vertically intermediate the frame members, comprising in combination, a support member disposed in a generally horizontal plane below said frame and carrying the said rotary cutter mechanism, a cutter-revolving shaft journaled on said support member extending from the support member to drivingly engage said rotary cutter mechanism, power-transmitting means interengaging said motor-driving shaft and said cutter-revolving shaft and arranged to transmit rotative force from the motor-driven shaft to the cutter-revolving shaft and to permit limited up and down movement of the cutter-revolving shaft relative to the motor-driven shaft while in interengagement with the power-transmitting means, a first pivot means and second pivot means having axes extending transversely of the frame and spaced longitudinally of the frame, said first and second pivot means being carried on said frame members, an operating lever extending radially of said first pivot means, rotative means operatively engaged to said lever means to be rotated by the swinging of the operating lever in an arc, first crank arms carried by each of said first and second pivot means adjacent opposite sides of said frame to be swung in arcs upon the axes of said pivot means, said rotative means being operatively connected to at least one of said first crank arms to cause the same to swing on its axis upon rotation of the rotative means by said lever, connecting means operatively connecting said first crank arms to cause all the first crank arms to swing in unison upon the swinging of said at least one of said first crank arms by said rotative means, second crank arms engaged to each of said first crank arms adjacent opposite sides of said frame to be simultaneously swung in arcs on the respective axes of the first crank arms by the swinging of the first crank arms, link means operatively connecting said second crank arms and said support member to raise and lower the support member and the rotary cutter mechanism carried thereby by the swinging of said second crank arms, said link means each having a first end pivotally connected to the free end of one of said second crank arms and a second end pivotally connected to the said support member at spaced locations below and corresponding with said second crank arms to permit the vertical raising and lowering of the support member by the second crank arms without swinging about the axes of said second pivot means, biasing means operatively connected to said frame and first crank arms for urging said crank arms in a rotational direction moving the link means in a direction toward raising the said support member and the rotary cutter mechanism carried thereby relative to the frame, detent means associated with said operating lever and carried by said frame for retaining the said lever in selected positions for selectively determining the elevation of the support member and rotary cutter mechanism carried thereby relative to said frame, and guard means carried by said support member on opposite sides of said frame at locations laterally outwardly of said first and second crank arms to guard the first and second crank arms from lateral intrusion at said locations into the space between the frame and support member.

2. Apparatus for raising and lowering a rotary cutter mechanism relative to the frame of a mower, the frame having a pair of spaced and longitudinally extending frame members, the mower having a motor carried by the frame and a motor-driven shaft extending downwardly along an axis disposed generally vertically intermediate the frame members, comprising in combination, a support member disposed in a generally horizontal plane below said frame and carrying the said rotary cutter mechanism, a cutter-revolving shaft journaled on said support member extending from the support member to drivingly engage said rotary cutter mechanism, power-transmitting means interengaging said motor-driven shaft and said cutter-revolving shaft and arranged to transmit rotative force from the motor-driven shaft to the cutter-revolving shaft and to permit limited up and down movement of the cutter-revolving shaft relative to the motor-driven shaft while in interengagement with the power-transmitting means, a first pivot means and a second pivot means having axes extending transversely of the frame and spaced longitudinally of the frame, said first and second pivot means being carried on said frame members, an operating lever extending radially of said first pivot means, rotative means operatively engaged to said lever means to be rotated by the swinging of the operating lever in an arc, first crank arms carried by each of said first and second pivot means to be swung in arcs upon the axes of said pivot means, said rotative means being operatively connected to at least one of said first crank arms to cause the same to swing on its axis upon rotation of the rotative means by said lever, connecting means operatively connecting said first crank arms to cause all the first crank arms to swing in unison upon the swinging of said at least one of said first crank arms by said rotative means, second crank arms engaged to each of said first crank arms to be simultaneously swung in arcs on the respective axes of the first crank arms by the swinging of the first crank arms, link means operatively connecting said second crank arms and said support member to raise and lower the support member and the rotary cutter mechanism carried thereby by the swinging of said second crank arms, said link means each having a first end pivotally connected to the free end of one of said second crank arms and a second arm pivotally connected to the said support member at spaced locations below and corresponding with said second crank arms to permit the vertical raising and lowering of the support member by the second crank arms without swinging about the axes of said second pivot means, detent means associated with said operating lever and carried by said frame for retaining the said lever in selected positions for selectively determining the elevation of the support member and rotary cutter mechanism carried thereby relative to said frame, and guide means carried by the frame extending along opposite sides of the frame and the adjacent top of the support member at locations laterally outwardly of said first and second crank arms and blocking the space between the frame and support member at said locations from ingress at said sides and arranged for guiding movement of the support member and permitting limited movement thereof toward and away from said frame.

3. Apparatus for raising and lowering a rotary cutter mechanism relative to the frame of a mower, the frame having a pair of spaced and longitudinally extending frame members, the mower having a motor carried by the frame and a motor-driven shaft extending downwardly relative to the frame along a generally vertical axis, said rotary cutter mechanism having a cutter-revolving shaft extending upwardly therefrom along a generally vertical axis, comprising in combination a support member disposed in a generally horizontal plane below said frame and carrying said rotary cutter mechanism in position to direct the said cutter-revolving shaft toward and in axial alignment with said motor-driven shaft, power-transmitting means operatively interengaging said motor-driven shaft and said cutter-revolving shaft to cause rotation of the cutter-revolving shaft by rotation of the motor-driven shaft, said power-transmitting means including spline means arranged to permit variable spacing between said motor-driven shafts and cutter-revolving shaft while maintaining said operative interengagement, first crank arms pivotally carried by said frame on generally parallel and spaced axes disposed in a generally horizontal plane, lever means pivotally carried by the frame and operatively connected to said first crank arms to cause the first crank arms to simultaneously swing in arcs on their respective axes, second crank arms operatively connected to said first crank arms and mounted on common axes, respectively, to simultaneously swing therewith in arcs on their respective axes, link members connected to said second crank arms and to said support member for causing the support member to be elevated in accordance with the swinging of the said second crank arms on their respective axes, each said link member having a first end pivotally connected to a free end of a second crank arm, respectively, and a second end pivotally connected to the support member at a corresponding location below the second crank arms to cause the support member to be raised and lowered by the swinging of the second crank arms without causing the support member to swing about the axes of said second crank arms, the arrangement providing for the raising and lowering of the support member carrying the rotary cutter mechanism while operatively interconnected with the motor by operation of said lever means, said first and second crank arms and said link members being generally disposed in a space between said frame and said support member, and plates disposed at locations laterally outwardly of the first and second crank arms and link members along said frame to guide the up and down movement of the support member relative to the frame and to block inward lateral intrusion into said space at said locations, said plates being carried by one of said frame and support member.

4. Apparatus as claimed in claim 3 and including resilient biasing means operatively interconnecting said frame and said first crank arms to bias the second arms to swing in a direction for urging the support member upwardly toward the frame in opposition to the force of gravity, and detent mean operatively interconnecting the lever means and frame for retaining the lever means in selected position and the support member in selective elevated position relative to the frame.

5. Apparatus for raising and lowering a rotary cutter mechanism relative to the frame of a motor-powered mower to selected elevations at any time, whether or not the mower is operating and whether or not the mower is traveling, without disengagement of the power-drive between mower motor and rotary cutter mechanism, the said mower having a downwardly extending motor-driven shaft and said rotary cutter mechanism having an upwardly extending cutter-revolving shaft, comprising in combination a support member disposed generally horizontally below said frame, said support member carrying said rotary cutter mechanism to be raised and lowered with the support member relative to said frame, motion-transmitting means operatively interengaging said motor-driven shaft and said cutter-revolving shaft to drive the cutter-revolving shaft, said motion-transmitting means including telescopic means permitting variations in the vertical spacing between said motor-driven shaft and said cutter-revolving space while maintaining the operative interengagement therebetween upon the changing of the elevation of the rotary cutter mechanism carried by the support member relative to said frame, a plurality of first crank arms pivotally carried by said frame to swing in vertical planes disposed substantially longitudinally of the frame and spaced transversely of said frame, one pair of said first crank arms being pivotally swingable on horizontal axes at a forward location along the frame and another pair of said first crank arms being pivotally swingable on horizontal axes at a rearward location along the frame, connecting means operatively connecting the first crank arms at one of said locations with the first crank arms at the other of said locations to cause corresponding swinging of said crank arms at the said forward and rearward locations in unison, lever means extending upwardly from said frame and operatively connected to said first crank arms at one of said locations to pivotally swing the same and concurrently swing the said first crank arms at said other location through said connecting means upon the operation of said lever means, a plurality of second crank arms pivotally carried by said frame and disposed at angles to the first crank arms and interengaged therewith to swing on the corresponding first crank arms whereby swinging of the first crank arms causes corresponding swinging of the second crank arms disposed at said angles thereto, link means connecting each of said second crank arms to said support member at horizontally spaced locations thereon to cause the support member to be raised and lowered while maintained in said generally horizontal plane upon the swinging of said second crank arms, each of said link means at a first end thereof being pivotally connected to the free ends, respectively, of the second crank arms and at a second end thereof being pivotally connected to said support member at said locations to permit raising and lowering of the support member upon swinging of the second crank arms without the swinging of the support member on the axes of the second crank arms, whereby the elevation of the rotary cutter mechanism carried by the support member is selectively varied by operation of said lever means, and guide and guard means disposed laterally outwardly of said first and second crank arms, connecting means, and link means on opposite sides of said frame and disposed to guide the raising and lowering of the support member relative to the frame and to guard the said first and second crank arms, connecting means and link means from laterally inwardly directed intrusion at the sides of the frame.

6. Apparatus as claimed in claim 5 and including biasing means operatively connecting said frame and said first crank arms to bias the second crank arms in a direction for urging said support member upwardly in opposition to the force of gravity.

7. Apparatus as claimed in claim 6 and including selective detent means operatively connecting said frame and said lever means for selectively locking the lever means in alternate selective positions for maintaining the support member at alternate selective elevations.

8. In a mower having a frame, a motor carried thereby, and a rotary cutter mechanism disposed below the frame for mowing operation, the combination of power-transmitting means carried by the frame for transmitting driving power from the motor to the rotary cutter mechanism, said power-transmitting means including means for permitting variation in the elevation of the rotary cutter mechanism relative to the frame during operation of the power-transmitting means, linkage means interconnecting the frame and rotary cutter mechanism for suspending the rotary cutter mechanism below the frame while maintaining the rotary cutter mechanism in a generally horizontal plane for mowing operation, said linkage means including arm members swingable in arcs about pivots carried by the frame and having generally horizontally disposed axes, said linkage means including links having one end pivotally connected to the arm members and an opposite end pivotally connected to the said cutter mechanism to permit vertical raising and lowering of the said cutter mechanism by the swinging of said arm members in said arcs without the swinging of the said cutter mechanism in corresponding arcs, connecting means operatively connecting said arm members to cause said arm members to swing in unison in said arcs, the swinging of said arm members in said arcs varying the effective extension of said linkage means relative to the frame and the spacing relative to the frame of the rotary cutter mechanism connected to the linkage means, operating means carried by the frame for manipulation by the operator of mower and operatively interengaged with said arm members for selective swinging of said arm members on their respective axes and corresponding raising and lowering of the rotary cutter mechanism suspended by the said linkage means, and overlapping side plates carried by the frame and cutter mechanism on opposite sides of the frame and vertically slidable relative to each other to maintain the cutter mechanism in alignment with the frame at its various spacings relative to the frame, said side plates being disposed laterally outwardly of said linkage means interconnecting the frame and rotary cutter mechanism to guard the linkage means from intrusion laterally inwardly between the frame and the rotary cutter mechanism.

9. The combination claimed in claim 8 and including biasing means carried by the frame biasing the rotary cutter mechanism toward the frame to aid the linkage means supporting the rotary cutter mechanism.

10. The combination claimed in claim 8 and in which said operating means includes a lever pivotally carried by the frame for swinging in an arc by the said operator, detent means carried by the frame for holding the lever in predetermined positions, and rods interconnecting the lever and arm members.

11. In a riding power mower having a frame including transversely spaced longitudinally extending frame members, a motor carried by the frame, the motor having a downwardly extending motor-driven shaft, a hood member disposed below the frame in a generally horizontal plane, rotary cutting means carried by the hood member, an upwardly extending cutter-revolving shaft carried by the hood member and operatively connected to the rotary cutting means for driving the same, the combination of splined telescopic power-transmitting means interconnecting the motor-driven shaft and cutter-revolving shaft to transmit power therebetween and allowing variation in the spacing between the motor-driven shaft and cutter-revolving shaft while interconnected, a plurality of suspension means interconnecting the frame and the hood member each at spaced locations on the frame and hood member to support the hood member below the frame in said generally horizontal plane, said suspension means having variable effective lengths at said spaced locations in accordance with the spacing of the hood member from the frame, means interconnecting the suspension means at said spaced locations to provide uniform simultaneous variations in the effective lengths of the said plurality of suspension means, operating means carried by the frame and actuatable by the operator of the mower while riding thereon and operatively connected to said suspension means for selectively varying the uniform effective lengths thereof and the elevation of the hood member supported by the linkage means, and guard means disposed at opposite sides of the frame and carried thereby, said guard means being disposed laterally outwardly of said suspension means at said locations to guard the same at varying elevations of the hood member relative to the frame from laterally outwardly of the frame at said locations, said guard means being arranged to accommodate for said varying elevation of the hood member relative to the frame.

12. The combination claimed in claim 11 and including spring means carried by the frame and operatively interengaged with said hood member to aid in the support of the hood member and rotary cutting means carried thereby, and guide means carried by the frame and operatively interengaged with said hood member to guide movement of the hood member toward and away from the frame.

References Cited
UNITED STATES PATENTS

| | | | |
|---|---|---|---|
| 2,945,338 | 7/1960 | Burrows et al. | 56—25.4 |
| 3,063,226 | 11/1962 | Pfauser | 56—25.4 |
| 3,205,642 | 9/1965 | Smith | 56—25.4 |

ABRAHAM G. STONE, *Primary Examiner.*

P. A. RAZZANO, *Assistant Examiner.*

UNITED STATES PATENT OFFICE
CERTIFICATE OF CORRECTION

Patent No. 3,357,165    December 12, 1967

Donald G. Thon

It is certified that error appears in the above identified patent and that said Letters Patent are hereby corrected as shown below:

In the heading to the printed specification, line 4, "the M. F. & D. Company" should read -- The M. T. & D. Company -

Signed and sealed this 12th day of August 1969.

(SEAL)
Attest:

Edward M. Fletcher, Jr.    WILLIAM E. SCHUYLER, JR.
Attesting Officer    Commissioner of Patents